May 10, 1966     C. K. DONNELL     3,250,115
FREEZING POINT ANALYZER
Filed Dec. 23, 1963     2 Sheets-Sheet 2
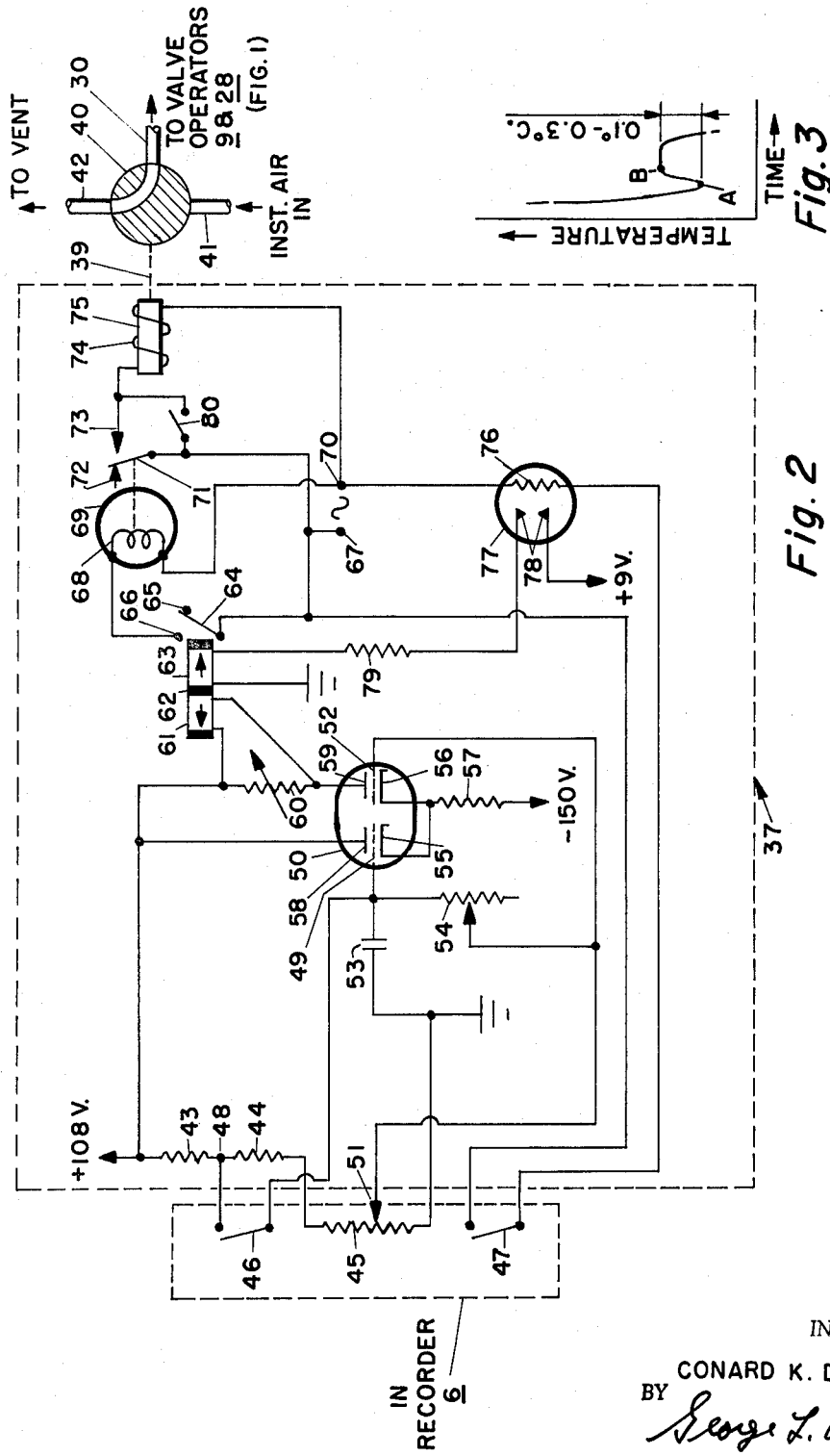
INVENTOR.
CONARD K. DONNELL
BY *George L. Church*
ATTORNEY United States Patent Office 3,250,115
Patented May 10, 1966

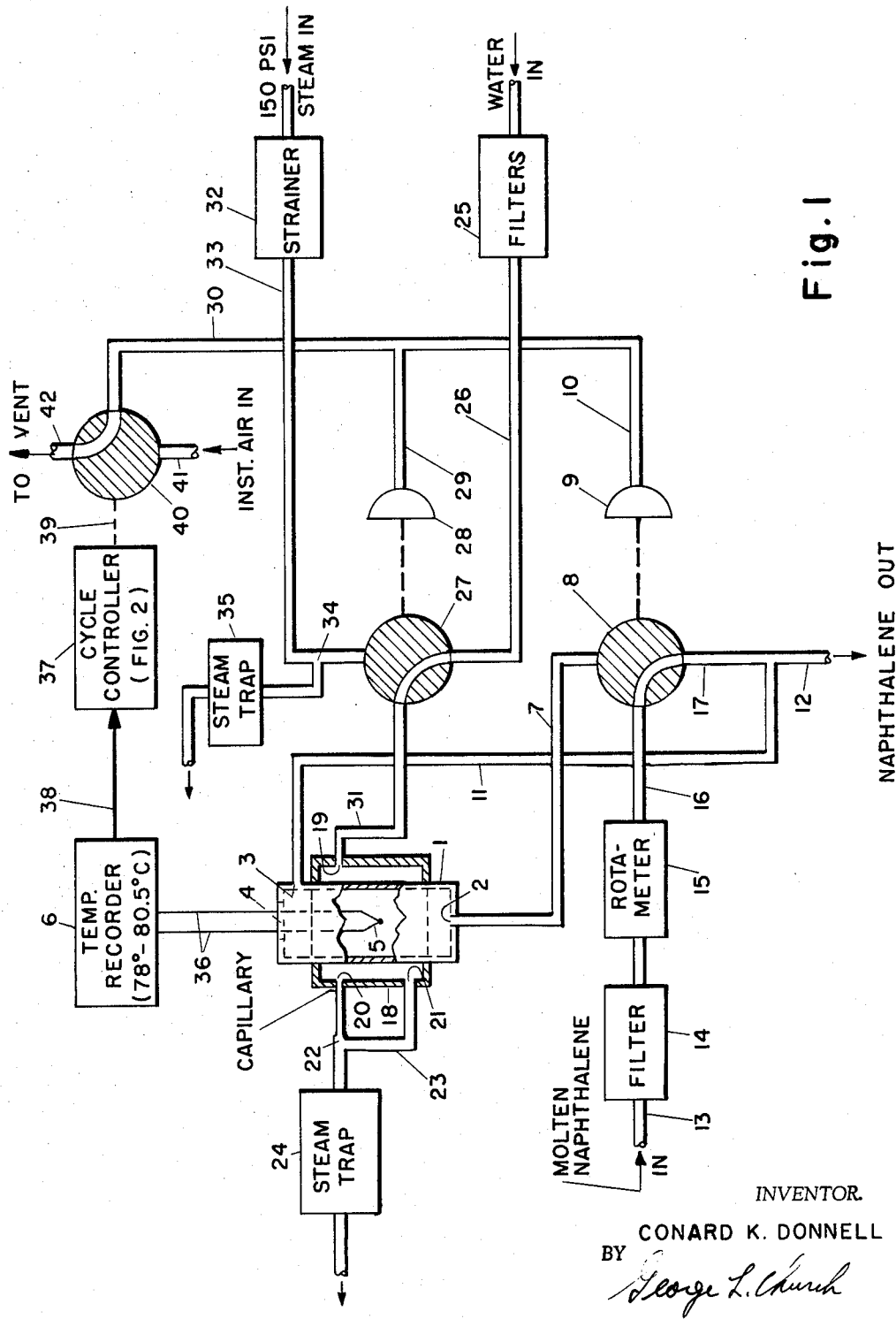

3,250,115
FREEZING POINT ANALYZER
Conard K. Donnell, Springfield, Pa., assignor to Sun Oil Company, Philadelphia, Pa., a corporation of New Jersey
Filed Dec. 23, 1963, Ser. No. 332,830
3 Claims. (Cl. 73—17)

This invention relates to a freezing point analyzer, and more particularly to such an analyzer useful for determining the freezing point of naphthalene or of other materials which are solid at room temperature.

The present invention is an improved analyzer of the type disclosed in my copending but now abandoned application, Serial No. 321,488, filed November 5, 1963. The said prior application discloses a stream analyzer for automatically measuring and recording the melting point of a fusible solid substance, such as petroleum-derived paraffin wax. Such analyzer operates cyclically to automatically trap a sample and record its melting point.

When manufacturing petroleum naphthalene, it is necessary to check its purity, since purity is an important characteristic of the finished product. This checking can be accomplished by determining the freezing point of the naphthalene, since the freezing point is a direct measure of purity. For optimum results in the measurement of purity, it is necessary that the freezing point be measured to an accuracy of about ±0.05° C.

A problem arises when the melting point analyzer described in the aforesaid application is used for the automatic and cyclic determination of the freezing point of naphthalene. Naphthalene has a pronounced tendency toward supercooling, i.e. toward cooling below its true freezing point before solidification begins. Even though the maximum temperature extent of the supercooling is only a few tenths of a degree below the true freezing point, this is large as compared to the desired accuracy of measurement of the freezing point, and, moreover, it is not constant but varies from sample to sample (i.e., from cycle to cycle of operation of the analyzer). The analyzer described in my prior copending application would operate to trap a sample of hot liquid naphthalene and cool it rapidly until the detector trips when the temperature of the sample first stops its downward trend (which, for naphthalene, would be at the supercooling point) or when it begins to move upward slightly (which, for naphthalene, would be just following, in time, the supercooling point); when the detector thus trips, the heating of the sample would immediately begin. Since the analyzer of the prior application operates in the manner just described, this means that, with naphthalene or similar materials, the cooling cycle would be interrupted before the true freezing point plateau was reached; thus, under these conditions, the true freezing point of the naphthalene would not be recorded. As previously explained, it is necessary, for proper operation of the analyzer, that the true freezing point of the naphthalene be recorded, since the supercooling point cannot be relied on as an indication of the freezing point, at least not to the desired accuracy.

An object of this invention is to provide a novel freezing point recorder for naphthalene or similar materials.

Another object is to provide an improved automatic, cyclic freezing point analyzer which will operate effectively to record the true freezing point of materials which become supercooled.

The objects of this invention are accomplished, briefly, in the following manner: A molten sample of the naphthalene or similar material, whose true freezing point is to be recorded, is trapped in a chamber which is surrounded by a jacket. A cooling medium (e.g., water) is caused to flow through the jacket. The sample cools rapidly until the supercooling point is reached, following which the temperature of the sample rises somewhat (quite rapidly) until the true freezing point plateau is reached. At this latter point, solidification of the sample takes place and the temperature of the sample remains constant for an appreciable length of time while the heat of fusion is liberated. A temperature-sensing device measures the temperature of the sample in the chamber and supplies its output signal to a recorder; a cycle controller connected to this recorder senses the supercooling point and at the corresponding time (or slightly thereafter) closes a circuit which, after a time delay sufficient to allow the sample to reach its true freezing point temperature, energizes an air solenoid which operates valves to disconnect the cooling medium from the jacket and to supply a heating medium (e.g., steam) thereto. Also, a sample valve then opens to flush the chamber with fresh sample. As soon as the sample melts or liquefies, fresh hot sample flows through the chamber, and the temperature thereof increases rapidly. When the temperature recorder goes off scale at the high temperature end, a limit switch on the recorder reverses the valves (so as to shut off the steam, turn on the water, and close the sample valve) and starts a new cycle.

A detailed description of the invention follows, taken in conjunction with the accompanying drawings, wherein:

FIG. 1 is a schematic structural and piping diagram of an analyzer according to the invention;

FIG. 2 is a circuit schematic of a cycle controller; and

FIG. 3 is a typical cooling curve for naphthalene.

FIG. 1 illustrates the analyzer of this invention as set up to measure the freezing point of naphthalene. With this setup, the analyzer operates as a cyclic analyzer which traps a liquid (molten) sample and records its freezing point automatically about every fifteen to twenty minutes. The analyzer comprises a small, jacketed sample chamber, two three-way pneumatic valves, a strip-chart recorder, and a cycle controller which operates an air solenoid controlling the flow of air to the pneumatic valves. Speaking generally, the analyzer functions by recording a cooling curve of the sample. From this cooling curve, the freezing point may be determined. A differential amplifier (to be later described in detail), operating in response to temperature changes in the sample, controls the operation of the analyzer.

Refer now to FIG. 1. A sample chamber 1, which may be a stainless steel tube of ¾ inch O.D. and eight inches long, has three openings 2, 3, and 4. Opening 2 is a sample inlet at the bottom of the chamber, opening 3 is a sample outlet at the top of the chamber, and opening 4 in an opening for a resistance thermometer (illustrated as a thermocouple) 5 which is inserted from the top of the chamber. Thermometer 5 is positioned inside chamber 1, at the center of the volume within this chamber, and actuates a strip-chart temperature recorder 6 (referred to further hereinafter) with a full-scale range of 78° to 80.5° C.

Molten naphthalene can flow into chamber 1 through a line 7 connected to opening 2, under the control of a three-way pneumatic valve 8. Valve 8 is operated by means of a diaphragm-type operator 9 supplied with compressed air via line 10. Valve 8 is illustrated in the de-energized position, with no air pressure on diaphragm 9. In this position, the lower end of line 7 is cut off or closed. If molten naphthalene has previously been flowing through chamber 1, in the illustrated position of valve 8 a sample of the hot, liquid naphthalene (molten naphthalene) is trapped in chamber 1.

Naphthalene can flow out of chamber 1 through a line 11 connected to opening 3, line 11 extending to a "naphthalene out" line 12.

The molten naphthalene sample line 13 conveys the hot, liquid naphthalene through an in-line filter 14, and then through a rotameter 15 which indicates sample flow through the line. The filter 14 is provided to prevent fouling the rotameter 15 or pneumatic valve 8. From rotameter 15, a line 16 extends to valve 8.

In the illustrated, de-energized position of valve 8, line 16 is conected to a bypass line 17 which leads to "naphthalene out" line 12. Thus, in this position of valve 8, sample flows through the bypass 17 around the sample chamber 1. This bypass arrangement minimizes deadtime in the sample lines.

When air pressure is supplied to diaphragm 9, valve 8 is operated to its energized position. Now, line 16 is connected to line 7, and the bypass pipe 17 is closed off. Sample then can flow into chamber 1 via lines 16 and 7, and opening 2, returning via opening 3 and lines 11 and 12.

The sample chamber 1 is surrounded by a jacket 18 which has three openings 19, 20, and 21. Opening 19 is a steam and water inlet at the top of the jacket, opening 20 is an outlet at the top of the jacket, and opening 21 is an outlet at the bottom of the jacket. As indicated by legend, upper outlet 20 has coupled thereto a capillary restrictor, to allow vapor to vent from the jacket 18 while it is filling with water. This capillary restrictor is coupled to one arm of a T fitting 22. Opening 21 is coupled by a pipe 23 to the second arm of the T, while the inlet of a steam trap 24 is coupled to the third arm of the T 22. When steam is admitted to the jacket 18, the steam pressure forces the water out of the bottom outlet 21 rapidly and completely.

Water, which serves as a cooling medium for chamber 1 when fed to jacket 18, is supplied through one or more filters 25 to a line 26 which is coupled to a three-way pneumatic valve 27. Valve 27 is similar to valve 8, and the former is operated by means of a diaphragm-type operator 28 supplied with compressed air via line 29. Line 29 is manifolded with line 10 into a valve air line 30, to be further referred to hereinafter. Thus, valve operators 9 and 28 are supplied with air at the same time, so that valves 8 and 27 operate concurrently.

Valve 27 is illustrated in the de-energized position, with no air pressure on diaphragm 28. In this position, line 26 is connected to a common inlet line 31 connected to jacket inlet 19. Thus, in this position of valve 27, water is flowing into jacket 18 via lines 26 and 31, and out of the jacket via line 23 and steam trap 24, which latter allows water to pass freely.

Steam, which serves as a heating medium for chamber 1 when fed to jacket 18, is supplied through a strainer 32 to a line 33 which is coupled to the three-way valve 27. In order to keep line 33 heated at all times, a T fitting 34 is provided in line 33 near valve 27, and from this T a branch line extends to the inlet of a steam trap 35.

When air pressure is supplied to diaphragm 28, valve 27 is operated to its energized position. Now, line 33 is connected to line 31, and the line 26 is closed off. Steam then flows into jacket 18 via lines 33 and 31, forcing the water out of the jacket at 21.

Summarizing the operation of the valves 8 and 27, air pressure on both diaphragm (9 and 28, respectively) will result in steam being fed to the jacket 18, and in the connection of the sample line 16 to the sample chamber 1. With no air pressure on the diaphragms (the valves then being in the positions illustrated), water will flow through the jacket, a sample will be trapped in the sample chamber, and molten naphthalene will flow through the bypass 17.

The temperature of the naphthalene in chamber 1 is measured by a resistance thermometer 5 which is located in the center of this sample chamber. By way of example, thermometer 5 may be a nominal 400-ohm platinum resistance thermometer, which actuates a suitable temperature transmitter (not shown). The latter in turn actuates (by means of a pair of leads 36, which carry the D.C. control signal) the electronic strip-chart recorder 6. The recorder 6 may be a Taylor Series 700J electronic recorder, equipped with a retransmitting slidewire and two limit switches (see FIG. 2), which latter are operated (closed) when the recorder is at the high or 80.5° end of the temperature scale. The temperature range of the recorder, as previously mentioned, is 78° to 80.5° C., full-scale. Each division of the temperature chart represents 0.025 degree.

The slidewire and switches in recorder 6 actuate a cycle controller 37 (shown in detail in FIG. 2, and to be described hereinafter) by way of a number of electrical conductors which are schematically indicated by a single line 38 in FIG. 1.

A relay in the cycle controller 37 is connected to energize (after a time delay) a solenoid, and this solenoid mechanically operates (by way of a connection schematically represented by dotted line 39) a three-way air control valve 40. Instrument air (clean, dry, compressed air, regulated to about twenty p.s.i.) is supplied to valve 40 by way of air supply pipe 41. The valve air line 30, previously referred to, is connected to valve 40, and a vent pipe 42 is also coupled to valve 40.

When the relay contacts in controller 37 are open, the solenoid connected therewith is unenergized, and the valve 40 is in the unenergized position illustrated. In this valve position, the air supply pipe 41 is closed or cut off, and valve air line 30 is connected to vent 42, so that there is no air pressure on the diaphragms 9 and 28, these diaphragms then being in fact vented to the atmosphere. The valves 27 and 8 thus will be in the (unenergized) position illustrated.

When the relay contacts in controller 37 are closed, the solenoid connected therewith is energized after a certain time delay (to be further referred to hereinafter), operating valve 40 to an energized position wherein supply pipe 41 is connected to the valve air line 30 and vent 42 is closed or cut off. This causes air to be supplied to diaphragms 28 and 9 by way of pipes 41 and 30 (and also 29 and 10), operating the three-way valves 27 and 8 to their other (i.e., energized) positions, previously described.

Now refer to FIG. 2, which illustrates the cycle controller 37, and its relation to elements of the temperature recorder 6. Speaking generally, the cycle controller is actuated from a retransmitting slidewire in the recorder. A dual triode differential amplifier holds a relay open during the cooling cycle (i.e., during the time when water is flowing through the jacket 18) as long as the recorder pen is moving, or until it moves appreciably up-scale from a minimum point. When the temperature (measured by thermometer 5) remains constant for a little time, or when it begins to move upward slightly from the supercooling point toward the true freezing point, the relay closes. After a time delay, a new heating cycle begins.

A voltage divider comprising series-connected resistances 43, 44, and 45 is connected between the positive 108-volt terminal and an intermediate terminal (which is zero potential, or ground) of a power supply (not shown). Resistances 43 and 44 are located in cycle controller unit 37, while resistance 45 is the retransmitting slidewire of recorder 6. The said voltage divider is so designed that the potential at the upper end of slidewire 45 is +50 volts with respect to ground.

The recorder 6 is also equipped with two limit switches 46 and 47, both of which are normally open, being closed only when the recorder is at the high or 80.5° end of the temperature scale. One terminal of switch 46 is connected to a +60 volt point 48 at the junction of resistances 43 and 44, while the other terminal of this switch is connected directly to one grid (the left-hand grid) 49 of a dual triode electron discharge device 50. The slider 51 of the retransmitting slidewire 45 is connected directly to the other grid (the right-hand grid) 52 of the dual triode. A capacitor 53 of rather large capacitance (e.g., eighteen mfd.) is connected between grid 49 and ground, and a five-megohm adjustable resistor 54 is connected between slider 51 (grid 52) and grid 49 (one terminal of switch 46).

The two cathodes 55 and 56 of device 50 are connected through a common resistor 57 to a negative 150-volt terminal on the aforementioned power supply. The anode 58 of the left-hand triode (to wit, the anode associated with grid 49 and cathode 55) is connected directly to the positive 108-volt terminal, while the anode 59 of the other triode is connected through an adjustable load resistor 60 to the same positive terminal.

One coil 61 of a two-coil bi-stable mercury-wetted relay 62 (illustrated as a differential relay) is connected across resistor 60, so that coil 61 is energized in response to current flow through this resistor. Relay 62 has another coil 63, and is so arranged that current through coil 63 operates the movable contact 64 of the relay to engage a fixed contact 65, while current through coil 61 operates the movable relay contact 64 to engage a fixed contact 66. The illustrated position of relay 62 (to wit, contacts 64 and 65 in engagement) is termed the "non-operating" or "open" position of the relay; for the relay to be in this position, the last preceding coil current flow must have been through coil 63. The other position of relay 62 (to wit, contacts 64 and 66 in engagement) is termed the "operating" or "closed" position of the relay.

Contact 64 is connected to one terminal 67 of an alternating current power source, while contact 66 is connected through the operating winding 68 of a time delay device 69, for example a "Hydon ten-minute timer," to the other alternating current power terminal 70. The time delay device 69 may comprise a clock-type synchronous motor driving a cam (not shown) which in turn mechanically operates a movable contact 71 cooperating with a pair of fixed contacts 72 and 73. Contact 71 is normally closed on contact 72. However, when winding 68 is energized the motor drives the aforesaid cam, which after a certain time delay (e.g., ten minutes) moves contact 71 over to the (normally open) contact 73. Thus, when relay 62 "operates" to close contact 64 on contact 66, winding 68 is energized from the A.C. power source, and after the established time delay (provided by device 69) contact 71 closes on contact 73.

Contact 71 is connected to A.C. power terminal 67, while contact 73 is connected through the winding 74 of an A.C. solenoid 75 to the other A.C. power terminal 70. Thus, when contacts 71 and 73 are closed, solenoid 75 is energized. A manually-operated switch 80 is connected in parallel with contacts 71 and 73, so that when switch 80 is closed, solenoid 75 remains energized irrespective of the position of contacts 71 and 73. When switch 80 is open, the analyzer cycles automatically; when this switch is closed, the sample is continuously heated. Solenoid 75 mechanically operates the air control valve 40, and controls the supply of air to pneumatic valves 27 and 8 (FIG. 1).

When relay 62 is open (assuming that switch 80 is open), winding 68 is unenergized and contacts 71 and 73 are open, so that solenoid 75 is unenergized, and valve 40 is in the position illustrated; in this valve position, no air pressure is supplied to the diaphragm valve operators 28 and 9, leaving valves 27 and 8 in their unenergized positions illustrated in FIG. 1. When relay 62 closes, winding 68 is energized to close contacts 71 and 73 after the set time delay, thereby energizing solenoid 75 after this time delay. When solenoid 75 is so energized, valve 40 is operated to its energized position, wherein air is supplied to valve operators 28 and 9, to operate valves 27 and 8 to their energized positions.

When the pen of the recorder 6 is at the high end of the chart, the slider 51 is at the upper end (50-volt end) of slidewire 45, and switch 46 is closed. The closing of switch 46 holds grid 49 at +60 volts, and capacitor 53 is charged to 60 volts, through a circuit having substantially a zero time constant. The potential on grid 52 is that of the slider 51, which is only +50 volts. Grid 49 being at a higher potential than grid 52, the left-hand triode conducts current and its cathode 55 reaches a potential of approximately +60 volts. Since the two cathodes 55 and 56 are connected together, grid 52 is about 10 volts negative with respect to the corresponding cathode 56, so that right-hand triode is cut off and relay 62 is non-operating or open, there then being no current flow through resistor 60 such as to energize coil 61.

When relay 62 is open, winding 68 is unenergized and contacts 71 and 73 are open, so that solenoid 75 is unenergized, there is no air pressure on diaphragm operators 28 and 9, and water is flowing through the jacket 18 (FIG. 1), cooling the sample trapped in chamber 1. Also, at this time, naphthalene is flowing through the bypass 17, a sample having been previously trapped in chamber 1.

When the pen of the recorder 6 begins to move down scale (in response to the cooling of the sample, as sensed by thermometer 5), switch 46 opens, leaving the capacitor 53 with a 60-volt charge. This immediately starts to leak off through the resistor 54, since the lower end of this resistor is connected to slider 51 (then at a point on slidewire 45 whose potential is less than 60 volts). As the slider 51 moves down slidewire 45, the voltage on grid 52 decreases proportionately. The voltage on grid 49 can follow only as capacitor 53 discharges through resistor 54. That is to say, the voltage on grid 49 is prevented from decreasing as rapidly (as that on grid 52) by the time delay network 53, 54. As the capacitor 53 discharges, grid 49 follows grid 52, but always remains positive with respect to grid 52.

Now refer to FIG. 3, which is a portion of a representative or typical cooling curve (time vs. temperature of the material, during cooling) for naphthalene. During cooling, the naphthalene has a tendency to supercool, i.e. to cool to a point A (whose temperature is below that of the true freezing point B) before solidification begins. However, solidification on the cold wall of the sample chamber 1 (FIG. 1), followed by freezing radially inward, is enough to limit the supercooling to a few tenths of a degree, as indicated by legend in FIG. 3. After the sample reaches the super-cooled temperature of point A, its temperature increases quite rapidly to the true freezing point temperature (plateau) of point B, at which its temperature then remains constant for an appreciable length of time (e.g., for several minutes) while the heat of fusion is liberated; the increase to the true freezing point temperature takes place as solidification begins in the sample. Continued cooling after the heat of fusion is liberated causes the temperature of the solid sample to decrease from point (plateau) B.

The reaching of the supercooling point A is of course sensed by thermometer 5, coupled to recorder 6. It should be apparent, from the cooling curve of FIG. 3 (which represents actual conditions during the cooling portion of the analyzer cycle), that at point A the sample temperature stops decreasing and remains more or less constant for a short time, following which it turns upward toward point B. When the supercooling point A is reached, therefore, the slidewire slider 51 stops moving downwardly. This causes the voltage on grid 52 to remain constant for a short time (determined by the width or time extent of the FIG. 3 curve at point A, before the curve turns upwardly), while the capacitor 53 continues to discharge. When the voltage on grid 49 (to which the ungrounded side of capacitor 53 is directly connected) decreases sufficiently to become equal to that on grid 52, the right-hand triode conducts, energizing coil 61 and causing relay 62 to close (contact 64 then engaging contact 66).

The action just described (in the preceding paragraph)

assumes that the sample temperature remains constant at point A for a sufficient length of time for this to occur (thereby causing the voltage on grid 52 to remain constant for a sufficient length of time). However, even if the temperature of the sample does not remain constant at point A long enough for the foregoing action to occur, the differential amplifier circuit will be tripped as soon as the sample temperature moves appreciably upward (from point A toward point B, FIG. 3). When the sample temperature moves upward, slidewire slider 51 moves upward, i.e. toward the positive end of slidewire 45; this causes the voltage on grid 52 to increase in the positive direction. Appreciable movement of slider 51 upward causes the voltage on grid 52 to increase sufficiently to become equal to that on grid 49. When this occurs, the right-hand triode conducts, energizing coil 61 and causing relay 62 to close.

From the foregoing, it may be seen that relay 62 is closed either at the temperature of point A, or somewhat above this temperature, as the sample temperature moves appreciably upward from point A toward point B. It will be recalled that the point B temperature is the true freezing point of the naphthalene sample. If the heat were turned on (i.e., if steam were admitted to the jacket 18, FIG. 1) when relay 62 closes, the cooling cycle would be interrupted before the true freezing point plateau at B was reached, and the true freezing point would not be recorded. Therefore, the time delay device 69 is utilized. This delay device delays the application of power to the air solenoid 75 until the sample has cooled long enough for the temperature thereof to reach the peak at the freezing point plateau of point B, and preferably long enough so that the sample begins to cool slightly again after this peak. This latter positively ensures that the actual peak temperature at B has been reached.

When relay 62 closes, winding 68 is energized, and, after a time interval determined by the operation of time delay device 69, contacts 71 and 73 close to energize solenoid 75. This operates valve 40 to its other position, wherein air is supplied to the valve operators 28 and 9, to operate valves 27 and 8 to their energized positions. Then, the water is cut off from the jacket 18, and steam is admitted thereto, heating chamber 1. Also, at this time, the sample line is opened to the sample chamber 1.

When sample chamber 1 heats, the temperature recorder 6 drives up scale, closing the two limit switches 46 and 47 when the recorder pen reaches the high or 80.5° end of the chart. The closing of switch 46 brings grid 49 back to +60 volts, which is a higher potential than that on grid 52 at this time. In this connection, it will be recalled that the potential at point 48 is higher than that at the upper end of slidewire 45. The left-hand triode then conducts again, and the right-hand triode is again cut off, by bias obtained through the common cathode resistor 57, as before. This bias of the differential amplifier stops current flow through coil 61, but relay contacts 64 and 66 remain closed.

When limit switch 47 closes, alternating current power is applied to the heater 76 of a normally open time delay relay 77, through an obvious series circuit coupled to alternating current power terminals 67 and 70. Time delay relay 77 controls a pair of contacts 78 which, when closed, complete a series circuit from a unidirectional energizing source through a resistor 79 to relay coil 63. When the contacts 78 of time delay relay 77 close, coil 63 of the relay 62 is energized and its contacts 64 and 66 disengage. During the delay interval of time delay relay 77, valves 27 and 8 remain in their energized positions, due to the engagement of contacts 64 and 66 during this interval, with the resultant energization of winding 68, engagement of contacts 71 and 73, and energization of air solenoid 75. Thus, during this interval sample flows through the sample chamber 1, to flush it thoroughly for the subsequent cycle. Also, of course, during this interval steam continues to be applied to jacket 18.

The opening of contacts 64 and 66 de-energizes winding 68, causing opening of contacts 71 and 73 and de-energization of solenoid 75 to begin a new cycle, by removing air from pneumatic valves 27 and 8, bringing them to the positions illustrated in FIG. 1. A sample becomes trapped in chamber 1, and the cooling medium (water) starts to flow through chamber 18. When the recorder pen begins to move down scale as the sample cools, switch 47 opens, as well as switch 46. The opening of switch 47 de-energizes the heater of time delay relay 77, opening its contacts 78 and de-energizing relay coil 63. However, contacts 64 and 65 remain closed, relay 62 then being ready to be "operated" or "closed" (by energization of its coil 61) when the sample reaches the supercooling point A, or somewhat thereafter.

Summarizing the action of the device of this invention, the analyzer traps a sample of molten naphthalene, and records its true freezing point automatically, about every fifteen to twenty minutes. The cycle begins with hot, liquid naphthalene (molten naphthalene) trapped in the chamber 1, and water flowing through the jacket 18. The sample cools rapidly until the supercooling point is reached. The cycle controller senses this temperature point and then, or slightly thereafter, operates a control device which, after a time delay, causes operation of the pneumatic valves 27 and 8. Then, steam is admitted to jacket 18 to melt the sample, and the sample valve 8 opens to flush the chamber with fresh sample. As soon as the naphthalene melts, fresh hot sample flows through the chamber and the chamber temperature increases rapidly. When the recorder goes off scale above 80.5°, the limit switches 46 and 47 reverse the pneumatic valves 27 and 8 (after a time delay) and start a new cycle, by trapping a sample of molten naphthalene in chamber 1 and by admitting water to jacket 18.

It may be noted that the analyzer of the invention has a fail-safe feature, in that if alternating current power is lost, the steam and sample valves will close. This occurs since, when the power is lost from terminals 67 and 70, the solenoid 75 (which is energized from these terminals) cannot be energized. Valve 40 then assumes the position illustrated, removing air pressure from pneumatic valves 8 and 27 and bringing them to the position illustrated in FIG. 1. In this position, the steam and sample lines are closed off from the chamber, sample continues to flow through the bypass 17, and water continues to flow through the jacket 18 to cool the sample chamber 1.

If successive naphthalene samples supercooled exactly the same amount (i.e., if there were exactly the same temperature difference between points A and B in FIG. 3, for successive samples), the delay device 69 would not be necessary. In this case, the recorder 6 could be offset so that the temperature corresponding to the recorded supercooling point agreed with a true freezing point, as determined by laboratory tests on a sample. In practice, this is not the case; the amount of supercooling varies from about $\frac{1}{10}$ of a degree to several tenths of a degree, on successive samples. Therefore, it is essential that the true freezing point plateau (peak B) be recorded, to achieve the required temperature accuracy (in measurement of the freezing point) of $\pm 0.05°$ C.

The invention claimed is:

1. Apparatus for cyclically determining the freezing point of a fusible solid substance which tends to become supercooled, comprising a sample chamber initially containing a molten sample of the substance, means for measuring the temperature of the sample in said chamber, controllable means for cooling said chamber, thereby to cool said sample so that its temperature decreases with time, means controlled by said temperature measuring means, in response to the cessation of decrease of the sample temperature for a preset and manually adjustable time interval, for producing a control signal; and means including a time delay device responsive to said signal and operating to cause said cooling means to be rendered ineffective and to cause a chamber heating means to be rendered effective.

2. Apparatus in accordance with claim 1, wherein said control signal producing means includes a relay which is operated to produce said signal, and wherein said time delay device is energized in response to the operation of said relay and delays for a predetermined time the action of the means which includes said device.

3. Apparatus in accordance with claim 1, wherein said control signal producing means includes a relay which is operated to produce said signal, and wherein said time delay device comprises a timer which is energized in response to the operation of said relay and which delays for a predetermined time the action of the means which includes said device.

References Cited by the Examiner

UNITED STATES PATENTS

| | | | |
|---|---|---|---|
| 2,885,885 | 5/1959 | Lupfer et al. | 73—17 |
| 3,143,876 | 8/1964 | Wallgren | 73—17 |
| 3,153,337 | 10/1964 | Gilson et al. | 73—17 |

OTHER REFERENCES

ASTM Test D87–57, "Melting Point of Paraffin Wax," American Society for Testing Materials Standards, 1961, Part 7, pages 18–20.

RICHARD C. QUEISSER, *Primary Examiner.*